United States Patent
Stein

(10) Patent No.: US 9,663,928 B2
(45) Date of Patent: May 30, 2017

(54) SANITARY INSERT UNIT

(71) Applicant: Neoperl GmbH, Mullheim (DE)

(72) Inventor: Alexander Stein, Ihringen (DE)

(73) Assignee: Neoperl GmbH, Müllhiem (DE)

( * ) Notice: Subject to any disclaimer, the term of this patent is extended or adjusted under 35 U.S.C. 154(b) by 0 days.

(21) Appl. No.: 15/000,446

(22) Filed: Jan. 19, 2016

(65) Prior Publication Data

US 2016/0222637 A1    Aug. 4, 2016

(30) Foreign Application Priority Data

Feb. 3, 2015  (DE) .................... 20 2015 000 855 U

(51) Int. Cl.
| | | |
|---|---|---|
| *E03C 1/08* | (2006.01) | |
| *E03C 1/084* | (2006.01) | |
| *G05D 7/01* | (2006.01) | |

(52) U.S. Cl.
CPC ................ *E03C 1/08* (2013.01); *E03C 1/084* (2013.01); *G05D 7/012* (2013.01); *G05D 7/014* (2013.01)

(58) Field of Classification Search
CPC ...... E03C 1/08; E03C 2001/082; E03C 1/084; E03C 1/086; G05D 7/012; G05D 7/014
USPC ...................................................... 239/428.5
See application file for complete search history.

(56) References Cited

U.S. PATENT DOCUMENTS

| | | | | |
|---|---|---|---|---|
| 3,847,178 A * | 11/1974 | Keppel | ..................... | F16K 1/36 137/515.7 |
| 4,562,960 A * | 1/1986 | Marty | ..................... | E03C 1/084 138/45 |
| 7,594,519 B2 * | 9/2009 | Hart | ..................... | G05D 7/012 138/43 |
| 8,348,227 B2 | 1/2013 | Zoller | | |
| 2010/0147397 A1 * | 6/2010 | Zoller | ..................... | G05D 7/012 137/115.13 |
| 2011/0278380 A1 * | 11/2011 | Zoller | ..................... | E03C 1/08 239/601 |
| 2012/0325928 A1 * | 12/2012 | Gransow | ..................... | B05B 1/16 239/8 |
| 2013/0068860 A1 * | 3/2013 | Tempel | ..................... | B05B 1/3033 239/428.5 |

FOREIGN PATENT DOCUMENTS

DE        102006057787        5/2008

* cited by examiner

*Primary Examiner* — Darren W Gorman
(74) *Attorney, Agent, or Firm* — Volpe and Koenig, P.C.

(57) ABSTRACT

A sanitary insert unit which is fittable on the water outlet of a sanitary outlet fitting and has a flow-restricting or control device with a flow-restricting or control element. The flow-restricting or control device or at least the flow-restricting or control element thereof is guided displaceably under pressure of inflowing water from a starting position counter to a restoring force into a flow-restricting or control position. A jet splitter is connected downstream on an outflow side of the flow-restricting or control device. The jet splitter divides the water flowing therethrough into a multiplicity of individual jets. A guide pin protrudes from the jet splitter on an inflow side. The flow-restricting or control element of the flow-restricting or control device is displaceably guided on the guide pin. The sliding path is limited between the jet splitter and a sliding stop on a pin end region of the guide pin facing away from the jet splitter.

15 Claims, 4 Drawing Sheets

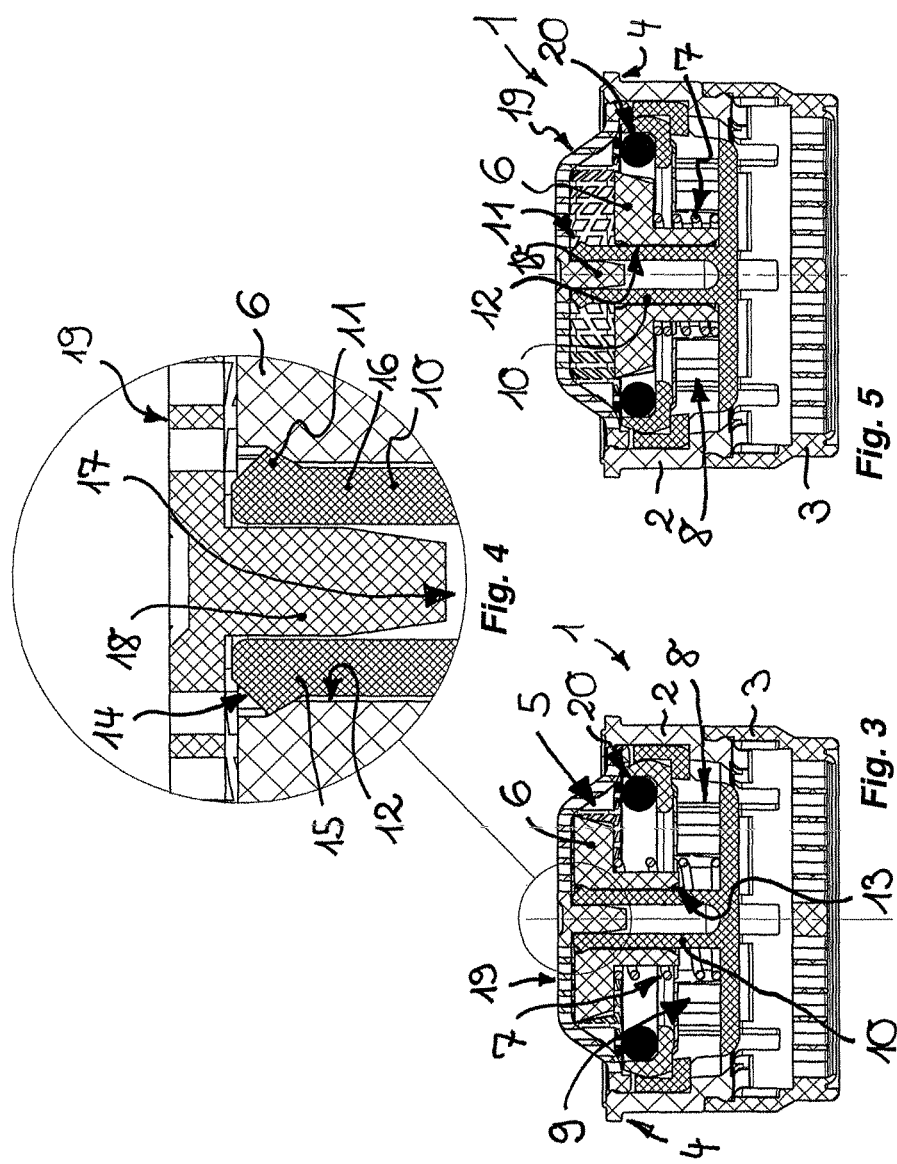

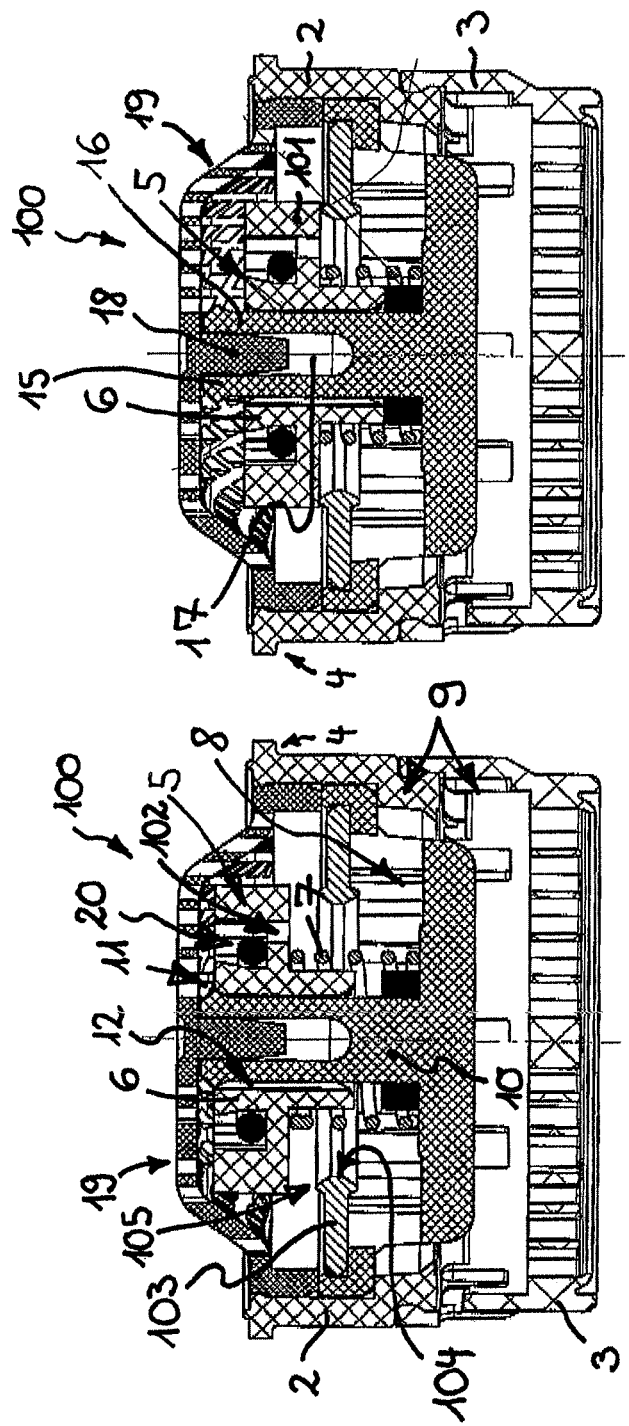

SANITARY INSERT UNIT

INCORPORATION BY REFERENCE

The following documents are incorporated herein by reference as if fully set forth: German Patent Application No. 202015000855.0, filed Feb. 3, 2015.

BACKGROUND

The invention relates to a sanitary insert unit which is fittable on the water outlet of a sanitary outlet fitting and has a flow-restricting or control device with a flow-restricting or control element.

Sanitary insert units which are insertable into an outlet mouthpiece in order to be fitted with said outlet mouthpiece on the water outlet of a sanitary outlet fitting are already known. The previously known insert units have a throughflow-quantity regulator, with an attachment screen or filter screen connected upstream thereof on the inflow side and a jet regulator is arranged downstream thereof on the outflow side. While the throughflow-quantity regulator has to adjust the water flowing therethrough to a fixed, maximum throughflow capacity irrespective of the pressure, the jet regulator of the previously known insert unit is intended to shape the outflowing water to form a homogeneous, non-sputtering and optionally also sparkling-soft water jet. The lime and dirt particles entrained in the water which could otherwise impair the correct functioning of the throughflow-quantity regulator and/or the jet regulator are filtered out with the aid of the attachment screen or filter screen connected upstream on the inflow side.

The throughflow-quantity regulators used in the previously known insert units generally have an annular flow-restricting body made from elastically deformable material, which, between itself and a central flow-restricting or control core, bounds a control gap which can be varied under the pressure of the water flowing therethrough. For this purpose, on the circumferential side, the control core has a control profiling, into which the elastically deformable flow-restricting body is increasingly molded, as the pressure of the water flowing therethrough increases, in such a manner that, even at high water pressures, a fixed maximum value of the throughflow capacity is not exceeded. At low water pressures which do not yet bring about a deformation of the elastic flow-restricting body, the previously known throughflow-quantity regulators constitute, however, a flow obstacle which additionally also restricts the quantity of water flowing therethrough.

Sanitary insert units of the type mentioned at the beginning have been made, in which the core which is profiled on the circumferential side is guided displaceably under the pressure of the water flowing therethrough from a starting position counter to a restoring force into a control position. While, in the control position, the elastically deformable flow-restricting body and the profiled control core are arranged in a functionally correct manner with respect to each other, in the unloaded starting position the profiled control core is in a screen interior which bounds the hat or plate-shaped attachment screen. Since a compression spring which also acts in the starting position on the flow-restricting or control core and presses said flow-restricting or control core in the direction of the attachment screen on the inflow side is provided as the restoring force, there is the risk that the attachment screen or filter screen becomes separated from the remaining constituent parts of the previously known insert unit and said insert unit falls apart.

SUMMARY

It is therefore the object to provide an insert unit of the type mentioned at the beginning which is distinguished by the high functional reliability thereof.

In the case of the sanitary insert unit of the type mentioned at the beginning, this object is achieved with one or more features according to the invention.

The insert unit according to the invention which is fittable on the water outlet of a sanitary outlet fitting has a flow-restricting or control device which either has to restrict the flow of water flowing therethrough or has to adjust the flow of water to a fixed maximum throughflow capacity. In order to switch on said flow-restricting or control device only in the event of increased water pressures, the flow-restricting or control unit of the insert unit according to the invention or at least the flow-restricting or control element thereof is guided displaceably under the pressure of the inflowing water from a starting position counter to a restoring force into a flow-restricting or control position. A jet splitter is connected downstream on the outflow side of the flow-restricting or control device of the insert unit according to the invention, said jet splitter having to divide the water flowing therethrough into a multiplicity of individual jets. A guide pin protrudes on the jet splitter on the inflow side, on which guide pin the flow-restricting or control device or at least the flow-restricting or control element thereof is displaceably guided. The sliding path of the flow-restricting or control device or of the flow-restricting or control element thereof is limited between the jet splitter and a sliding stop, which sliding stop is arranged at the pin end region of the guide pin facing away from the jet splitter. Since the restoring force acting even in the starting position on the flow-restricting or control device or at least the flow-restricting or control element thereof can be dissipated via the sliding stop and since the restoring force does not press the flow-restricting or control device or the flow-restricting or control element thereof against the attachment screen or filter screen on the inside, the risk is avoided that the restoring force will lift off the attachment or filter screen from the insert unit according to the invention and make it possible for the insert unit according to the invention to fall apart.

In order to be able to displaceably guide the flow-restricting or control device or at least the flow-restricting or control element thereof securely between the starting position and the flow-restricting or control position, it is expedient if the flow-restricting or control element has a, preferably central, guide opening, and if, for the relative displacement of flow-restricting or control element and guide pin, the guide opening is guided on the guide pin. In this embodiment, the flow-restricting or control element has a, preferably central, guide opening, wherein the flow-restricting or control element can be displaceably guided with said guide opening, for example on the guide pin.

In a structurally particularly simple embodiment according to the invention, the sliding stop is designed as cross-sectional extension of the guide pin. While that partial region of the guide pin which serves as sliding guide for the flow-restricting or control element has a smaller cross section, the sliding stop provided at the one pin end of the guide pin is designed, by contrast, as a cross-sectional thickening or cross-sectional extension.

In order to be able to push the flow-restricting or control element beyond the cross-sectional extension onto the guide pin, it is advantageous if an encircling slide-on slope is provided on the cross-sectional extension of the guide pin and/or on the circumferential edge region of the flow-restricting or control element, which circumferential edge region faces the guide pin and bounds the guide opening of the flow-restricting or control element. If the flow-restricting or control element and/or the guide pin is of correspondingly flexible design, the flow-restricting or control element can readily be pushed on the slide-on slopes beyond the cross-sectional extension of the guide pin onto the latter.

In a preferred development according to the invention, that pin end of the guide pin which bears the cross-sectional extension is split or divided into at least two pin segments, and the at least two pin segments are deflectable from a starting position into a sliding position close to each other. By sliding or pressing the flow-restricting or control element onto that pin end region of the guide pin which bears the cross-sectional extension, the press-on movement, which is oriented in the longitudinal direction of the pin, is converted into a radial deflecting movement of the at least two pin segments toward each other. Through this deflection movement of the pin segments, the cross section of the guide pin is reduced in the region of the cross-sectional extension thereof as the flow-restricting or control element is being pushed on. The cross-sectional extension can thereby be overcome as the flow-restricting or control element is pushed on without the secure support of the flow-restricting or control element on the guide pin subsequently being impaired.

In a development according to the invention which is independently worthy of protection, the pin segments are arranged around a plug-in opening formed in the guide pin, and a securing pin which prevents a deflection of the pin segments with respect to each other is insertable into the plug-in opening. Since, in this developing embodiment, the securing pin prevents an unintentional deflection of the pin segments toward each other, the flow-restricting or control element is securely and fixedly held on the guide pin even if a powerful restoring force acts on the flow-restricting or control element.

In order to ensure the operation of the jet splitter provided in the insert unit according to the invention and of the flow-restricting or control device, and in order not to impair said operation by dirt or lime particles entrained in the water, it is expedient if an attachment screen or filter screen is connected upstream of the flow-restricting or control device on the inflow side, and if the attachment screen or filter screen bears the securing pin. By attaching the attachment screen or filter screen to the insert unit according to the invention, the securing pin is therefore also pushed into the plug-in opening provided on the guide pin, as a result of which an unintentional deflection of the pin segments provided on the pin end region is effectively prevented.

It is advantageous if the insert unit has an insert housing, and if the attachment screen or filter screen is held releasably, and is preferably latchable releasably, on the insert housing.

In a preferred embodiment according to the invention, the flow-restricting or control device is designed as a through-flow-quantity regulator which has an annular and elastically deformable flow-restricting body which engages around the flow-restricting or control element and which, between itself and at least one adjacent, profiled circumferential wall, bounds a control gap which can be varied under the pressure of the water flowing therethrough. Such a throughflow-quantity regulator can adjust the quantity of water flowing therethrough per unit of time to a fixed maximum volume.

It is particularly advantageous if the attachment screen or filter screen bounds a screen interior, and if, in said screen interior, the flow-restricting or control device or at least the flow-restricting or control element thereof is displaceably guided.

In a preferred embodiment according to the invention, in the starting position, the flow-restricting or control element is provided above the flow-restricting body in the screen interior of the attachment screen or filter screen.

The restoring force acting on the flow-restricting or control core can be in the form, for example, of a rubber-elastic restoring element. However, in a particularly simple and easily producible embodiment according to the invention, the restoring force is in the form of a restoring spring or is applied by a restoring spring, and the restoring spring is preferably configured as a helical compression spring.

It is particularly advantageous if the flow-restricting or control element around which the elastic flow-restricting body engages has the profiled circumferential wall and in addition bears a control profiling on said circumferential wall.

BRIEF DESCRIPTION OF THE DRAWINGS

Developments according to the invention emerge from the claims and the description in conjunction with the drawings. The invention is described in more detail below with reference to a preferred exemplary embodiment.

In the drawings:

FIG. 3 shows the insert unit which is already shown in FIGS. 1 and 2 and is likewise illustrated here in a longitudinal section and the flow-restricting or control device of which has a flow-restricting or control element which is guided displaceably on a guide pin between the starting position shown here and a flow-restricting or control position, FIG. 4 shows the sanitary insert unit from FIGS. 1 to 3 in a detailed illustration likewise sectioned longitudinally here in the region of a securing pin which is integrally formed on the attachment screen or filter screen, which securing pin protrudes into a plug-in opening, which is open on the end side, in the guide pin, FIG. 5 shows the insert unit, which is likewise shown here in a longitudinal section, in the flow-restricting or control position of the flow-restricting or control element of the flow-restricting or control device thereof, FIG. 6 shows a sanitary insert unit which is illustrated in a longitudinal section and likewise consists here of an inflow-side attachment screen or filter screen, an outflow-side, ventilated jet regulator and a flow-restricting or control device arranged inbetween, wherein, in the case of the insert unit illustrated here, the entire flow-restricting or control device is guided displaceably and is located here in a starting position, FIG. 7 shows the insert unit from FIG. 6 in the flow-restricting or control position of the flow-restricting or control device thereof.

DETAILED DESCRIPTION OF THE PREFERRED EMBODIMENTS

Figure 2:
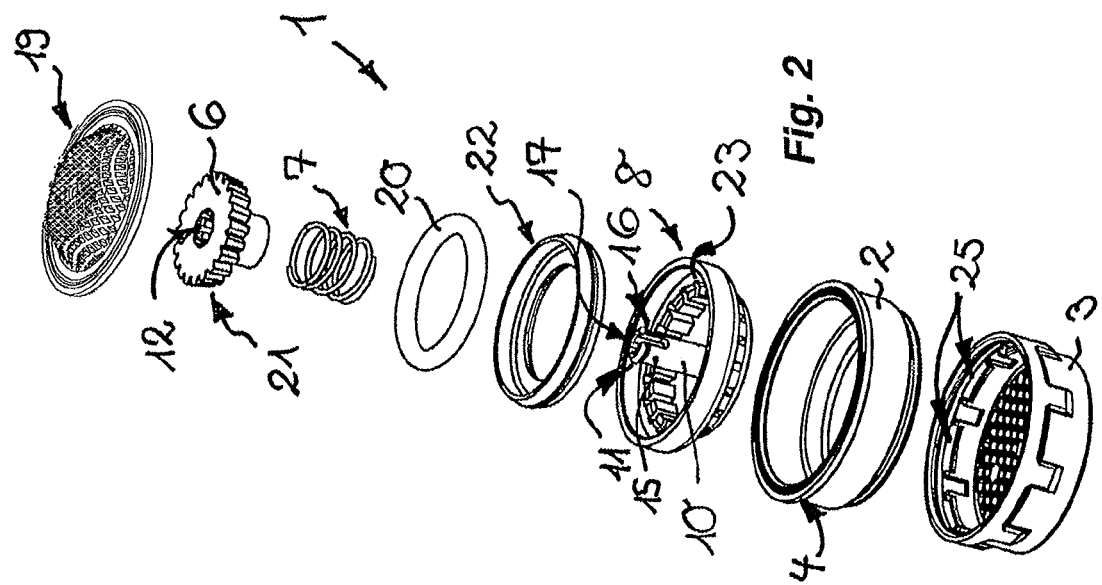
FIG. 2 shows the sanitary insert unit from FIG. 1 in a pulled-apart perspective illustration of the individual parts thereof.
Figure 1:
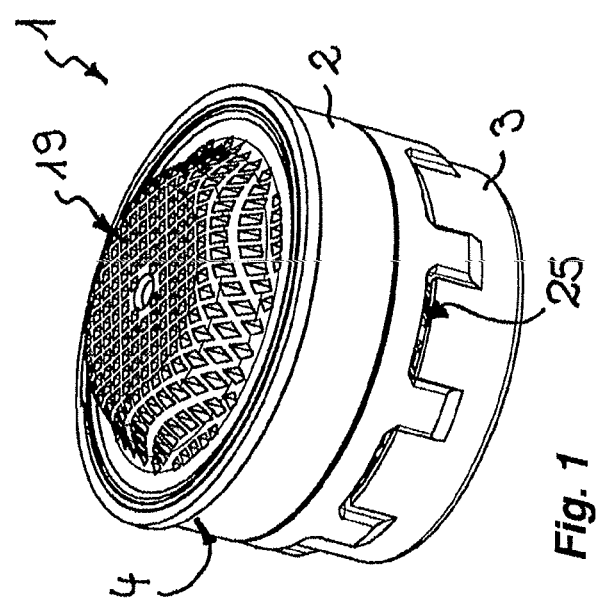
FIG. 1 shows, in a perspective side view, a sanitary insert unit which consists of an inflow-side attachment screen or filter screen, an outflow-side, ventilated jet regulator and a flow-restricting or control device arranged inbetween.

FIGS. 1 to 8 illustrate a sanitary insert unit in two embodiments 1, 100, which insert unit has an insert housing. The insert housing, which includes here of an inflow-side housing part 2 and an outflow-side housing part 3 connected releasably thereto, can bear an external thread on its housing outer circumference, with which external thread the insert unit 1, 100 can be screwed into an internal thread on the water outlet of a sanitary outlet fitting (likewise not shown here).

The insert units 1, 100 illustrated here instead have, on the end-side housing circumferential edge region thereof of the inflow-side housing part 2 thereof, an annular flange 4 which serves as an insert stop and up to which the insert units 1, 100 are insertable into a sleeve-shaped outlet mouthpiece (not illustrated further here). With the aid of said outlet mouthpiece, the sanitary insert units 1, 100 illustrated here are fittable on the water outlet of a sanitary outlet fitting.

The sanitary insert units 1, 100 have a flow-restricting or control device 5 which either has to restrict the flow of water flowing therethrough or to adjust said flow to a fixed maximum throughflow capacity. This flow-restricting or control device 5 is designed here as a throughflow-quantity regulator which has to adjust the water volume flowing therethrough per unit of time to a fixed maximum value irrespective of the pressure. For this purpose, the flow-restricting or control device 5 has a flow-restricting or control element 6 which is engaged around by an annular flow-restricting body 20 made of elastic material. When the flow-restricting or control device 1, 100 is operationally ready, the flow-restricting body 20, between itself and a control profiling 21 provided on the circumference of the flow-restricting or control element 6, bounds a control gap. As the pressure of the water flowing through rises, the flow-restricting body 20 produced from elastic material is increasingly pressed into the control profiling 21 in such a manner that the control gap is constricted. Since, as the pressure of the water flowing through increases, the elastically deformable flow-restricting body 20 is increasingly molded into the control profiling 21 of the flow-restricting or control element 6, the control gap can be varied under the pressure of the water flowing therethrough in such a manner that the flow-restricting or control device 5 is capable of adjusting a fixed maximum throughflow capacity irrespective of the pressure.

The jet splitter 8 of a ventilated jet regulator 9 is connected downstream on the outflow side of the flow-restricting or control device 5 in the insert units 1, 100. The jet splitter 8 has to divide the water flowing therethrough into a multiplicity of individual jets. The jet splitter 8 is of cup-shape design here. Throughflow openings 24 which are preferably spaced apart uniformly from one another in the circumferential direction and in which the individual jets are formed are provided on the circumferential wall of said cup shape. The plate-shaped base of said cup shape, at which a central guide pin 10 protrudes counter to the throughflow direction, serves as an impact surface at which the water coming from the flow-restricting or control device 5 is deflected in the direction of the throughflow openings 24. Since the throughflow openings 24 and the subsequent flow guidance in the region of the inflow-side housing part 2 constitute a cross-sectional constriction, the individual jets are accelerated in the region of the throughflow openings 24 in such a manner that a negative pressure is formed on the outflow side of the jet splitter 8 and in particular in the interior of the outflow-side housing part 3. As a consequence of said negative pressure, ambient air is sucked into the lower housing part 3 by ventilation openings 25 arranged on the housing circumference of the outflow-side housing part 3 and is mixed in said lower housing part with the water flowing therethrough before the water enriched in this manner with ambient air is shaped in a homogenizing device, which forms the outflow-side end side of the lower housing part 3 and is configured as a perforated structure, to form a homogeneous, non-sputtering and sparkling-soft water jet.

Figure 8:
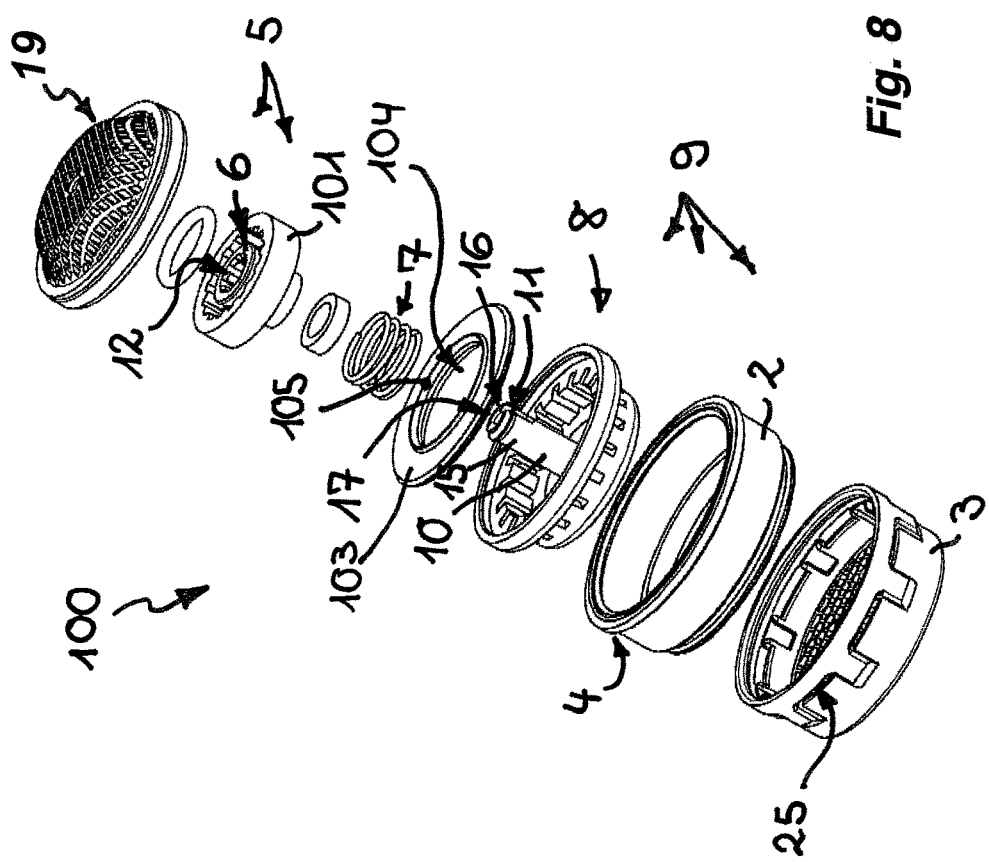
FIG. 8 shows the insert unit, which is already shown in FIGS. 6 and 7, in a pulled-apart perspective illustration of individual parts.

It becomes clear from a comparison of FIGS. 1 to 5, on the one hand, and of FIGS. 6 to 8, on the other hand, that the flow-restricting or control device 5 or at least the flow-restricting or control element 6 thereof is guided displaceably on the guide pin 10 protruding on the inflow side over the jet splitter 8. The sliding path of the flow-restricting or control device 5 or of the flow-restricting or control element 6 thereof is limited between the jet splitter 8 and a sliding stop 11, which is arranged at the pin end region of the guide pin 10 facing away from the jet splitter 8. In order to be able to displaceably guide either the entire and operationally ready flow-restricting or control device 5 (cf. FIGS. 6 to 8) or else only the flow-restricting or control element 6 thereof (cf. FIGS. 1 to 5) on the guide pin 10 the flow-restricting or control element 6 of the insert units 1, 100 has a, here centrally arranged, guide opening 12, in which guide opening 12 the guide pin 10 is displaceably guided. The sliding stop 11 is designed as a cross-sectional thickening or cross-sectional extension of the guide pin 10. In the case of the insert units 1, 100 illustrated here, an encircling slide-on slope 13, 14 is provided both on the cross-sectional extension of the guide pin 10, which cross-sectional extension serves as a sliding stop 11, and on the circumferential edge region of the flow-restricting or control element 6, which circumferential edge region faces the guide pin 10. That pin end of the guide pin 10 which bears the cross-sectional extension is split into at least two pin segments 15, 16, which pin segments 15, 16 are deflectable from a starting position into a sliding position close to each other. When the flow-restricting or control element 6 is pushed or pressed onto the guide pin 10, the exerted sliding movement, which is oriented in the longitudinal direction of the pin, is converted by means of the slide-on slopes 13, 14 into a radial deflection movement of the pin segments 15, 16 toward each other.

It becomes clear from a comparison of FIGS. 2 to 4 and 6 and 7 that the pin segments 15, 16 are arranged around a plug-in opening 17 formed in the guide pin 10. A securing pin 18 which prevents a deflection of the pin segments 15, 16 with respect to each other is insertable into said plug-in opening 17. The insert units 1, 100 have an inflow-side attachment screen or filter screen 19 which filters out the lime or dirt particles which are entrained in the inflowing water and which could otherwise impair the correct operation of the flow-restricting or control device 5 or of the jet regulator 9 in the insert housing 1, 100. The attachment screen or filter screen 19 is held releasably, and is preferably latchable releasably, at the screen outer circumference thereof on the insert housing of the insert unit 1 or 100. By attaching the attachment screen or filter screen 19 to the insert unit 1, 100, the securing pin 18, which is integrally formed in one piece on the inside of the attachment screen or filter screen 19, is pushed into the plug-in opening 17 of the guide pin 10 and prevents an unintentional falling apart of the insert unit 1, 100.

The flow-restricting or control device 5, which is in the form of a throughflow-quantity regulator, of the insert unit 1 illustrated in FIGS. 1 to 5 has a flow-restricting or control element 6 which is guided displaceably under the pressure of the inflowing water from the starting position shown in FIG. 3 counter to the restoring force of a restoring spring 7 into the flow-restricting or control position illustrated in FIG. 5. The annular flow-restricting body 20 rests on a support ring 22 which is inserted into the jet splitter 8 as far as an annular step 23 on the inner circumferential side. In the flow-restricting or control position according to FIG. 5, the flow-restricting body 20 located on the support ring 22 is positioned level with the control profiling 21, which is provided on the flow-restricting or control element 6, and can be molded under the pressure of the throughflowing water into the control profiling 21 depending on the pressure. While, in the starting position (shown in FIG. 3) of the insert unit 1, a comparatively wide annular gap still remains free between the flow-restricting or control element 6 and the elastic flow-restricting body 20, through which annular gap the water can flow practically unobstructed even at low water pressures and water quantities, in the flow-restricting or control position shown in FIG. 5 the water can still just pass through the control gap of the flow-restricting or control device 5, which is now operationally ready, if an increased water pressure has pressed the flow-restricting or control element into the annular opening of the flow-restricting body 20 counter to the restoring force of the restoring element 7. In said flow-restricting or control position according to FIG. 5, the flow-restricting or control device 6 adjusts the quantity of water flowing therethrough per unit of time to a fixed maximum value.

By contrast, in the case of the insert unit 100 shown in FIGS. 6 to 8, the entire and operationally ready flow-restricting or control device is moved between the starting position (shown in FIG. 6) and the flow-restricting or control position depicted in FIG. 7. For this purpose the flow-restricting or control device 5 of the insert unit 100 has a regulator housing 101 which is guided displaceably on the guide pin 10. The regulator housing 101 has an annular groove into which the elastic flow-restricting body 20 is placed. The central flow-restricting or control element 6, which is engaged around by the flow-restricting body 20, is formed in the regulator housing 101 by the annular groove. The control profiling 21, into which the elastic flow-restricting body 20 can be molded as the water pressure increases, is provided on at least one of the circumferential sides of the annular groove. In the flow direction behind the flow-restricting body 20, in the region of the control profiling 21, at least one throughflow direction 102 is provided on the groove base, through which the quantity of water adjusted by the flow-restricting or control device 5 has to pass. It becomes clear from a comparison of FIGS. 6 and 7 that the restoring element 7, which is in the form of a helical compression spring here, presses the flow-restricting or control device 5 of the insert unit 100 in the direction of the attachment screen or filter screen 19 and holds same in the starting position. In said starting position, the regulator housing 101 is arranged at a distance above a support 103. The support 103 is designed here as an annular disk which has a central support opening 104. In the starting position shown in FIG. 6, the water flowing through the insert unit 101 can still flow past the regulator housing 101 of the flow-restricting or control device 5, even at low water pressures, because of the large-sized support opening 104 in the direction of the jet splitter. By contrast, in the flow-restricting or control position shown in FIG. 7, the regulator housing 101 rests tightly on the support 103, and therefore the support opening 104 is closed and the water flowing through the latter only has to pass through the operationally ready flow-restricting or control device 5. So that the regulator housing 101 can rest tightly on the support 103 in the flow-restricting or control position shown in FIG. 7, an annular seal 105, in the form here of a lip seal, is provided on that edge region of the support 103 which bounds the support opening 104. In the flow-restricting or control position shown in FIG. 7, the at least one throughflow direction 102 of the flow-restricting or control device 5 opens into the support opening 104 of the insert unit 100.

It can be seen in FIGS. 5 and 6 that the attachment screen or filter screen 19 bounds a screen interior, wherein the flow-restricting or control device 5 or at least the flow-restricting or control element 6 is displaceably guided into said screen interior of the attachment screen or filter screen 19. In order to keep the friction between the guide opening 12 provided in the regulator housing 101, on the one hand, and the guide pin 10, on the other hand, as low as possible, guide ribs are provided on the inner circumference, which bounds the guide opening 12, of the flow-restricting or control element 6, which is of sleeve-shaped design here, said guide ribs being oriented in the longitudinal direction of the flow-restricting or control device 5 and forming a contact surface which is merely in the shape of a line between the inner circumference of the flow-restricting or control element 5 and the guide pin 10.

LIST OF REFERENCE NUMBERS

1 Insert unit (according to FIGS. 1 to 5)
2 Inflow-side housing part
3 Outflow-side housing part
4 Annular flange
5 Flow-restricting or control device
6 Flow-restricting or control element
7 Restoring spring
8 Jet splitter
9 Jet regulator
10 Guide pin
11 Sliding stop
12 Guide opening
13 Run-on slope (on the guide pin 10)
14 Run-on slope (on the flow-restricting or control core 6)
15 Pin segment
16 Pin segment
17 Plug-in opening
18 Securing pin
19 Attachment screen or filter screen
20 Flow-restricting body
21 Control profiling
22 Support ring
23 Annular stop
24 Throughflow openings
25 Ventilation openings
100 Insert unit (according to FIGS. 6 to 8)
101 Regulator housing
102 Throughflow opening
103 Support
104 Support opening
105 Annular seal

The invention claimed is:

1. A sanitary insert unit (1, 100) which is fittable on a water outlet of a sanitary outlet fitting, comprising:
   a flow-restricting or control device (5) with a flow-restricting or control element (6), the flow-restricting or control device (5) or at least the flow-restricting or control element (6) thereof is guided displaceably under pressure of inflowing water from a starting position counter to a restoring force into a flow-restricting or control position,
   a jet splitter (8) connected downstream on an outflow side of the flow-restricting or control device (5), said jet splitter dividing water flowing therethrough into a multiplicity of individual jets,
   a guide pin (10) protruding from the jet splitter (8) on an inflow side thereof, the flow-restricting or control device (5) or the flow-restricting or control element (6) thereof is displaceably guided on said guide pin (10),
   a sliding stop (11) arranged at a pin end region of the guide pin (10) facing away from the jet splitter (8), a sliding path of the flow-restricting or control device (5) or of the flow-restricting or control element (6) thereof is limited between the jet splitter (8) and the sliding stop (11), the sliding stop (11) is a cross-sectional extension of the guide pin (10), and
   an encircling slide-on slope is provided on the cross-sectional extension of the guide pin (10) facing away from the jet splitter.

2. The sanitary insert unit as claimed in claim 1, wherein the flow-restricting or control element (6) comprises a guide opening (12), and for a relative displacement of the flow-restricting or control element (6) and the guide pin (10), the guide opening (12) is guided on the guide pin (10).

3. The sanitary insert unit as claimed in claim 1, wherein a guide opening (12) is located centrally in the flow-restricting or control element (6).

4. The sanitary insert unit as claimed in claim 1, wherein an encircling slide-on slope is provided on a circumferential edge region of the flow-restricting or control element (6), and said circumferential edge region faces the guide pin (10) and bounds a guide opening (12) of the flow-restricting or control element (6).

5. The sanitary insert unit as claimed in claim 1, wherein the pin end region of the guide pin (10) which bears the cross-sectional extension is split or divided into at least two pin segments (15, 16), and the at least two pin segments (15, 16) are deflectable from a starting position into a sliding position closer to one another.

6. A sanitary insert unit (1, 100) which is fittable on a water outlet of a sanitary outlet fitting, comprising:
   a flow-restricting or control device (5) with a flow-restricting or control element (6), the flow-restricting or control device (5) or at least the flow-restricting or control element (6) thereof is guided displaceably under pressure of inflowing water from a starting position counter to a restoring force into a flow-restricting or control position,
   a jet splitter (8) connected downstream on an outflow side of the flow-restricting or control device (5), said jet splitter dividing water flowing therethrough into a multiplicity of individual jets,
   a guide pin (10) protruding from the jet splitter (8) on an inflow side thereof, the flow-restricting or control device (5) or the flow-restricting or control element (6) thereof is displaceably guided on said guide pin (10),
   a sliding stop (11) arranged at a pin end region of the guide pin (10) facing away from the jet splitter (8), a sliding path of the flow-restricting or control device (5) or of the flow-restricting or control element (6) thereof is limited between the jet splitter (8) and the sliding stop (11), the sliding stop (11) is a cross-sectional extension of the guide pin (10),
   an encircling slide-on slope (13, 14) is provided on the cross-sectional extension of the guide pin (10),
   the pin end region of the guide pin (10) which bears the cross-sectional extension is split or divided into at least two pin segments (15, 16), and the at least two pin segments (15, 16) are deflectable from a starting position into a sliding position closer to one another,
   the pin segments (15, 16) are arranged around a plug-in opening (17) formed in the guide pin (10), and
   a securing pin (18) which prevents a deflection of the pin segments (15, 16) with respect to each other is insertable into the plug-in opening (17).

7. The sanitary insert unit as claimed in claim 6, further comprising an insert housing, and an attachment screen or filter screen (19) held releasably on the insert housing.

8. The sanitary insert unit as claimed in claim 7, wherein the attachment screen or filter screen (19) is releasably latchable on the insert housing.

9. The sanitary insert unit as claimed in claim 6, further comprising an attachment screen or filter screen (19) connected upstream of the flow-restricting or control device (5).

10. The sanitary insert unit as claimed in claim 9, wherein the attachment screen or filter screen (19) bears the securing pin (18).

11. The sanitary insert unit as claimed in claim 7, wherein the flow-restricting or control device (5) is a throughflow-quantity regulator and comprises an annular and elastically deformable flow-restricting body (20) which engages around the flow-restricting or control element (6) and which, between itself and at least one adjacent, profiled circumferential wall of the sanitary insert unit, bounds a control gap that is variable under the pressure of the inflowing water.

12. The sanitary insert unit as claimed in claim 11, wherein the attachment screen or filter screen (19) bounds a screen interior in which the flow-restricting or control device (5) or at least the flow-restricting or control element (6) thereof is displaceably guided.

13. The sanitary insert unit as claimed in claim 12, wherein, in the starting position, the flow-restricting or control element (6) is provided above the flow-restricting body (20) in the screen interior of the attachment screen or filter screen (19).

14. The sanitary insert unit as claimed in claim 13, further comprising a restoring spring that generates the restoring force, the restoring spring is configured as a helical compression spring.

15. The sanitary insert unit as claimed in claim 14, wherein the flow-restricting or control element (6) around which the elastic flow-restricting body engages includes the profiled circumferential wall with a control profiling (21) on said circumferential wall.

* * * * *